(12) United States Patent
Davydenko (10) Patent No.: US 11,237,254 B2
(45) Date of Patent: Feb. 1, 2022

(54) DEVICE AND METHOD FOR SCANNING MEASUREMENT OF THE DISTANCE TO AN OBJECT

(71) Applicant: Scantinel Photonics GmbH, Ulm (DE)

(72) Inventor: Vladimir Davydenko, Bad Herrenalb (DE)

(73) Assignee: Scantinel Photonics GmbH, Ulm (DE)

( * ) Notice: Subject to any disclaimer, the term of this patent is extended or adjusted under 35 U.S.C. 154(b) by 0 days.

(21) Appl. No.: 17/228,117

(22) Filed: Apr. 12, 2021

(65) Prior Publication Data

US 2021/0364607 A1 Nov. 25, 2021

Related U.S. Application Data

(63) Continuation of application No. 17/022,522, filed on Sep. 16, 2020, now Pat. No. 11,009,593.

(30) Foreign Application Priority Data

May 25, 2020 (EP) ..................................... 20176355

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4816* (2013.01); *G01S 17/32* (2013.01); *G02F 1/31* (2013.01)

(58) Field of Classification Search
CPC ...... G01S 7/4817; G01S 7/4816; G01S 17/32; G02F 1/31
See application file for complete search history.

(56) References Cited

U.S. PATENT DOCUMENTS 9,683,928 B2 6/2017 Swanson
10,132,610 B2 11/2018 Swanson et al.
(Continued)

FOREIGN PATENT DOCUMENTS

DE 102018203315 A1 9/2019
WO WO 2020/227761 A1 11/2020

OTHER PUBLICATIONS

Scantinel Photonics GMBH, International Search Report and Written Opinion, PCT/EP2021/061713, dated Jul. 6, 2021, 13 pgs.
(Continued)

*Primary Examiner* — Samantha K Nickerson
(74) *Attorney, Agent, or Firm* — Morgan, Lewis & Bockius LLP (57) ABSTRACT

A device for scanning measurement of a distance to an object has a light source, which generates an optical output signal having a time-varying frequency. The device includes multiple optical processing units, which are connected optically in parallel to the light source. Each processing unit has an optical distribution matrix including multiple optical switches that distribute optical output signals selectively onto different optical waveguides. Optical output signals are outcoupled into the free space via free space couplers and optical output signals reflected on the object are coupled as optical measurement signals into the waveguides. A detector detects a superposition of the optical measurement signal and the optical output signal generated by the light source. A circulator directs optical output signals supplied by the light source to the distribution matrix and optical measurement signals coming from the distribution matrix to the detector.

23 Claims, 6 Drawing Sheets

(51) Int. Cl.
*G01S 17/32* (2020.01)
*G02F 1/31* (2006.01)

(56) References Cited

U.S. PATENT DOCUMENTS

| | | | |
|---|---|---|---|
| 10,527,727 B2 | 1/2020 | Bondy et al. | |
| 10,578,738 B2 | 3/2020 | Sebastian et al. | |
| 2005/0111785 A1* | 5/2005 | Zhao | G02F 1/31 385/16 |
| 2006/0126055 A1 | 6/2006 | Meneely et al. | |
| 2017/0249401 A1* | 8/2017 | Eckart | G06F 17/18 |
| 2017/0371227 A1 | 12/2017 | Skirlo et al. | |
| 2018/0267250 A1 | 9/2018 | Hosseini et al. | |
| 2018/0364336 A1 | 12/2018 | Hosseini et al. | |
| 2019/0018110 A1 | 1/2019 | Kremer et al. | |
| 2019/0025431 A1* | 1/2019 | Satyan | G01S 7/4817 |
| 2019/0265574 A1 | 8/2019 | Skirlo et al. | |
| 2019/0377135 A1 | 12/2019 | Mansouri et al. | |
| 2020/0142066 A1 | 5/2020 | Sandborn et al. | |
| 2020/0158830 A1* | 5/2020 | Asghari | G01S 7/4817 |
| 2020/0225332 A1 | 7/2020 | Wagner et al. | |
| 2020/0256958 A1 | 8/2020 | Piggott | |
| 2020/0256961 A1 | 8/2020 | Gaalema et al. | |
| 2020/0271784 A1 | 8/2020 | Bradford et al. | |
| 2020/0284883 A1* | 9/2020 | Ferreira | G01S 7/4816 |

OTHER PUBLICATIONS

Scantinel Photonics GMBH, European Search Report, EP 20176355.4, dated Oct. 26, 2020, 8 pgs.
Davydenko, Notice of Allowance, U.S. Appl. No. 17/022,522, dated Jan. 11, 2021, 8 pgs.

* cited by examiner

DEVICE AND METHOD FOR SCANNING MEASUREMENT OF THE DISTANCE TO AN OBJECT

CROSS-REFERENCE TO RELATED APPLICATIONS

The present application is a continuation of U.S. patent application Ser. No. 17/022,522 filed Sep. 16, 2020, which claims the benefit of European patent application 20176355.4 filed on May 25, 2020, both of which are incorporated herein by reference in their entireties.

BACKGROUND OF THE INVENTION

1. Field of the Invention

The invention relates to a device and a method for scanning measurement of the distance to a moving or unmoving object on the basis of the FMCW-LiDAR technology. Such devices can be used, for example, in autonomously driving vehicles and can be implemented as photonic integrated circuits (PIC), which do not contain moving parts.

2. Description of Related Prior Art

A measurement principle known as FMCW-LiDAR is known for optical distance measurement, in which an optical signal having time-varying frequency (FMCW stands for frequency modulated continuous wave) is directed onto the object to be measured and detected and evaluated after reflection on the object. If the Doppler shift is additionally taken into consideration, the relative velocity between the scanning device and the object may also be calculated. This measurement principle is described in greater detail for example in DE 10 2018 203 315 A1.

Scanners based on this measurement principle have to be very robust and reliable if they are to be used in vehicles. This is true in particular if the vehicles drive autonomously, since the safety in autonomous driving is decisively dependent on the scanner, which is used to generate a three-dimensional depiction of the environment. Such scanners ideally do not contain sensitive moving components such as scanning mirrors.

Scanners which are implemented as photonic integrated circuits do not require moving components and are therefore particularly suitable for applications in vehicles. Such scanners are disclosed, for example, in US 2017/0371227 A1 and US 2019/0377135 A1. A distribution matrix having multiple optical switches cascaded like a tree is used in these scanners, which distribute the optical signals onto different optical waveguides, which are associated with different scanning directions.

However, it is difficult using the previous approaches to collect sufficient items of distance information in a short time that three-dimensional images of the environment can thus be generated in real-time.

SUMMARY OF THE INVENTION

The object of the invention is to specify a device and a method for scanning measurement of the distance to an object which solve the abovementioned problems.

This object is achieved according to the invention by a device for scanning measurement of the distance to an object, which has a light source that is configured to generate an optical output signal having a time-varying frequency. The device furthermore comprises multiple optical processing units, which are optically connected in parallel to the light source. Each processing unit comprises an optical distribution matrix, which has multiple optical switches and is configured to selectively distribute an optical output signal supplied to the respective processing unit onto different optical waveguides. Furthermore, each processing unit comprises multiple free space couplers, which are connected to the optical waveguides and are each configured to outcouple an output signal guided in one of the optical waveguides into the free space and couple an optical output signal reflected at the object as an optical measurement signal. The processing units each additionally comprise a detector, which is configured to detect a superposition of the optical measurement signal with the output signal generated by the light source. In addition, each processing unit comprises an optical circulator, which is connected to the light source, the optical distribution matrix, and the detector such that the output signals supplied from the light source are conducted to the distribution matrix and optical measurement signals coming from the distribution matrix are conducted to the detector. The device additionally has a deflection optical unit, which is configured to deflect the output signals outcoupled from the free space couplers such that they are emitted in different directions. An evaluation unit of the device is configured to determine a distance to the object from the superposition detected by the detectors.

By way of the provision according to the invention of multiple substantially independent processing units arranged in parallel, which are connected to a common light source, it is possible to carry out multiple distance measurements simultaneously. The number of the distance measurements which can be carried out simultaneously is equal here to the number of the processing units and can be multiplied if the light source provides multiple frequency bands simultaneously (more on this below). Nonetheless, the device according to the invention is distinguished by very reliable measurement results, since the signal-to-noise ratio is high at the detectors of the processing units. This is related to the measurement signals, which are reflected from the object and are very weak in any case, only having to pass through the comparatively small distribution matrix of a single processing unit and also only a single optical circulator to reach the detector. The weak measurement signals are therefore only slightly attenuated by the optical components to be passed through on their path to the detector.

The comparatively small distribution matrices of the individual processing units also have advantages for the output signals propagating in the opposite direction. Since they only pass through few optical switches in the distribution matrix, high intensities do not have to be applied at the input of the distribution matrices to ensure sufficient intensities at the output of the free space couplers. In the conventional devices of this type, which have large distribution matrices, high intensities at the inputs of the distribution matrices are unavoidable, since it is only ensured by high intensities that the output signals will still have a sufficiently high intensity even after passing a large number of optical switches when they exit from the free space couplers. However, very high intensities can damage the optical switches and are therefore to be avoided.

When reference is made here and hereinafter to specific optical components or assemblies being connected to one another, this thus also includes nonpermanent connections, i.e., connections which are only temporarily established via optical switches.

In one embodiment, the deflection optical unit has a front focal plane, in which the free space couplers or images of the free space couplers are arranged. The optical output signals thus leave the deflection optical unit as collimated light beams, the direction of which is dependent on the location at which the optical output signals exit from a free space coupler. With such an arrangement, additional microlenses behind the free space couplers for the purposes of collimation can be omitted.

For the detectors, symmetrical photodetectors (balanced photodetectors) have proven to be particularly suitable, to which not only the optical measurement signals reflected from the object, but rather also the optical output signals generated by the light source are supplied. Such detectors only have low sensitivity to optical noise which is generated by the light source.

In one embodiment, a common optical amplifier is arranged in the light path between the light source and the processing units. Optical amplification can alternatively also take place inside the individual processing units, however.

In another embodiment, the light source is configured to generate multiple optical output signals having time-varying frequency in different frequency bands simultaneously. By using a grating, the light in the different frequency bands can be emitted in different directions, whereby scanning is possible not only in one plane but rather in all three spatial directions. In this case, the light source can have, for example, multiple individual sources, which are connected via a collection matrix, which has multiple optical switches and/or optical couplers, to the distribution matrix. Instead of a grating, another dispersive optical element can also be provided and in particular can be part of the deflection optical unit, which splits the optical output signals depending on the wavelength in a first plane, which is arranged at least essentially perpendicular to a second plane, within which the optical output signals exiting from the free space couplers propagate.

However, scanning in all three spatial directions is also possible if the free space couplers are arranged adjacent and one over another in a regular or irregular two-dimensional array. The deflection optical unit then translates the locations in this array into directions along which the optical output signals propagate.

The light source can be configured to generate an optical output signal, the frequency of which rises linearly and falls linearly alternately over time. Alternatively thereto, the dependence of the frequency on the time can be described by a sawtooth function.

The free space couplers are preferably edge couplers or grating couplers, as are known per se in the prior art.

In one embodiment, the optical distribution matrix has at least one first optical switch, which has a first switching time and a first insertion loss, and multiple second optical switches, which each have a second switching time, which is longer than the first switching time, and a second insertion loss, which is less than the first insertion loss. The first optical switch is arranged on a level of the tree here which is lower than the level on which the second optical switches are arranged.

This advantageous design is based on the finding that with suitable activation of the optical switches in the switching matrix, not all optical switches have to be operated with short switching times. If a fast optical switch (i.e., a switch having a short switching time) is arranged on a low level of the tree, the optical switches following thereon on the higher levels of the tree can be slower and therefore can have a longer switching time. This is because it is possible in this case that the slower switches change their switching state during a measurement interval in which no optical signals pass the slower switches in order to be prepared for the next measurement interval. Only the optical switch on the low level has to switch quickly to be able to establish a connection to the other branch of the tree between two successive measurement intervals with the least possible delay. While one branch connected to the fast switch is thus active in one measurement interval, the slow switches are changed over in the other branch and are located in the correct position when the active branches changes the fast switches after completion of the measurement interval.

The switching time is defined in the present case as the time span required to transfer 90% of the light intensity into the respective other switching state.

If there are no special requirements for the sequence in which the free space couplers from the switching matrix are connected to the light source, it is sufficient if a single first optical switch having a short switching time and higher insertion loss is arranged on the lowest level of the tree and exclusively second optical switches are arranged on all other levels, which are slower but have a lower insertion loss. In a distribution matrix having 16 outputs, the optical signals pass through, for example, four 1×2 switches, of which according to the invention, however, only the first switch passed through in the light path at the lowest level has to have a short switching time and therefore has a higher insertion loss. Due to the arrangement according to the invention of different switch types, the insertion loss of the entire distribution matrix can be reduced enough that the signals detected by the detector have a sufficiently high signal-to-noise ratio. The speed of the entire distribution matrix is only limited by the switching time of the fast first switch. As long as the second slow switches have a switching time which is shorter than the measurement frequency, the second optical switches can be optimized for minimal insertion loss.

Which optical switches are specifically used is dependent on the specific application. Especially for application in distance scanners which are used in autonomously driving vehicles, 1×2 switches based on thermo-optical or electro-optical Mach-Zehnder interferometers have proven to be suitable. In principle, however, other switches, for example, 1×3 switches or n×m switches in general, also come into consideration, wherein preferably n<m.

The subject matter of the invention is additionally a device for the scanning measurement of the distance to an object having a light source and having multiple optical processing units, which are connected optically in parallel to the light source. Each processing unit has an optical distribution matrix having multiple optical switches, a detector, and an optical circulator, which is connected to the light source, the optical distribution matrix, and the detector so that optical output signals supplied from the light source are conducted to the distribution matrix and optical measurement signals coming from the distribution matrix, which were reflected from the object, are conducted to the detector. An evaluation unit of the device is configured to determine a distance to the object from measurement signals detected by the detectors.

The subject matter of the invention is furthermore a method for the scanning measurement of the distance to an object, in which optical output signals are generated, which are distributed by multiple optical processing units arranged optically in parallel onto optical waveguides, wherein each processing unit has an optical circulator, an optical distribution matrix, which comprises multiple optical switches, and a detector. Output signals reflected at the object are coupled as optical measurement signals into one of the optical waveguides of the respective processing unit and conducted from the respective circulator after passage through the distribution matrix to the detector. Distances to the object are determined from measurement signals detected by the detectors.

BRIEF DESCRIPTION OF THE DRAWINGS

Further features and advantages of the invention will become apparent from the following description of exemplary embodiments with reference to the drawings, in which.

DESCRIPTION OF PREFERRED EMBODIMENTS

1. Application Example

Figure 1:
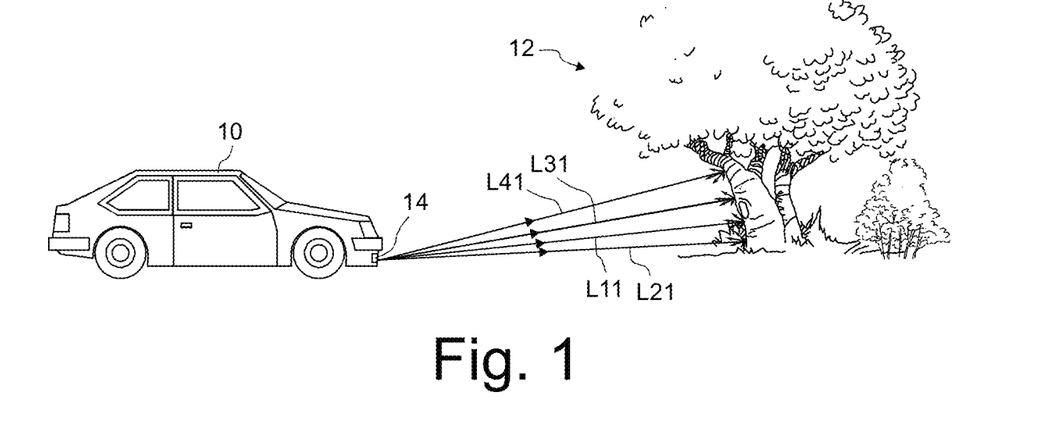
FIG. 1 shows a schematic side view of a vehicle which approaches an object which is detected by a scanning device according to the invention.

FIG. 1 shows a schematic side view of a vehicle 10, which approaches an object 12, which is a tree in FIG. 1. The vehicle 10 has at least one scanning device 14, which scans the environment lying ahead of the vehicle 10 with the aid of light beams L11, L21, L31, and L41, from which a three-dimensional image of the environment is calculated. In addition, the scanning device 14 determines the relative velocity in relation to the object 12. This information is important above all if the object 12 is another vehicle and also moves.

The items of information ascertained by the scanning device 14 about the environment lying ahead of the vehicle 10 can be used, for example, to assist the driver of the vehicle 10 in a manner assisting the driver in the vehicle control, by warning messages being generated if a collision of the vehicle 10 with the object 12 threatens. If the vehicle 10 drives autonomously, the items of information about the environment lying ahead are required by the control algorithms which control the vehicle 10.

Figure 2:
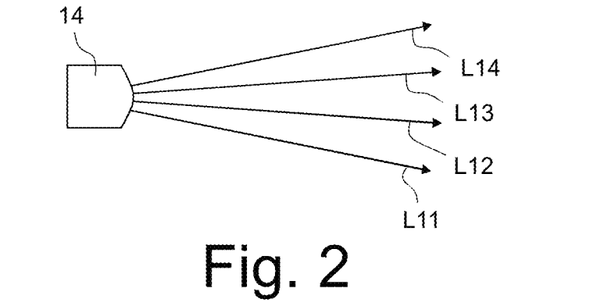
FIG. 2 shows a top view of the scanning device shown in FIG. 1.

As is apparent in FIG. 1, the scanning device 14 emits the light beams L11 to L41 in different directions in a vertical plane (this is the plane of the paper in FIG. 1), whereby the environment is scanned in the vertical direction. Scanning also takes place simultaneously in the horizontal direction, as FIG. 2 shows in a top view of the scanning device 14. Four light beams L11, L12, L13 and L14 are shown therein, which are emitted in a horizontal plane in different directions.

For reasons of clarity, it is presumed in FIGS. 1 and 2 that in each case only four light beams Ln1 to Ln4 in four different planes, i.e., a total of 16 light beams, are generated by the scanning device 14. The scanning device 14 preferably emits many more light beams. For example, $k \cdot 2^n$ light beams are preferred, wherein n is a natural number between 7 and 13 and specifies how many beams are emitted in one of k planes, wherein k is a natural number between 1 and 16.

2. Structure

Figure 3:
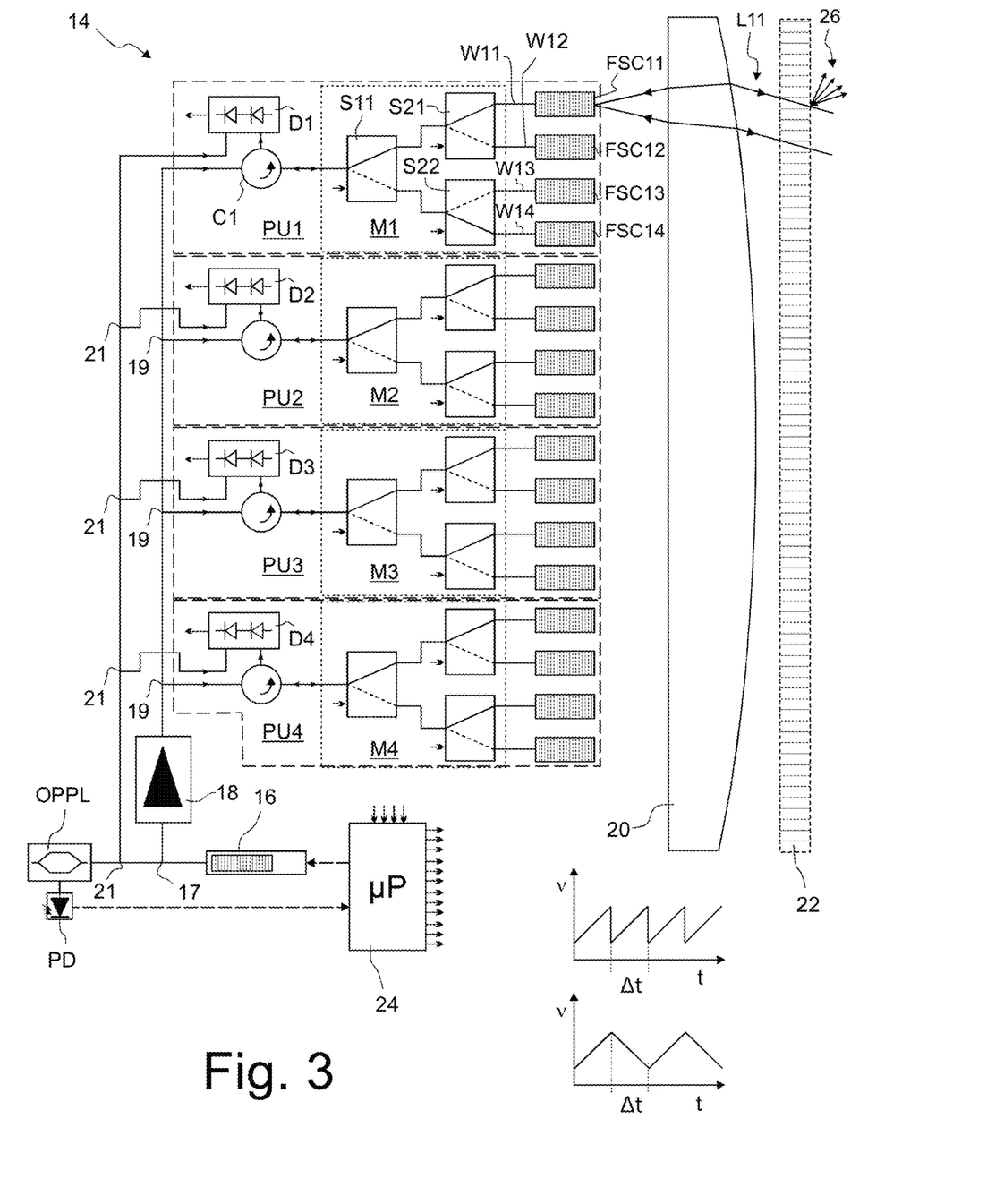
FIG. 3 shows the structure of the scanning device according to a first embodiment in a schematic illustration.

FIG. 3 shows the structure of the scanning device 14 in a schematic illustration. The scanning device 14, which is preferably constructed as a photonic integrated circuit, can in reality appear different in particular with respect to the dimensions and the profile of the optical waveguides.

The scanning device 14 comprises a light source 16, which generates an optical FMCW signal. The light source 16 thus does not generate, in contrast to conventional scanning devices, short light pulses having high pulse power, but rather a continuous signal, the frequency v of which varies over time. The dependence of the frequency v on the time t can be given, for example, by a sawtooth function or by a periodic triangular function, as the two graphs contained in FIG. 3 illustrate. In the case of a sawtooth function, the frequency v rises linearly during a measurement interval Δt then jumps back to its original value, again rises linearly at the same slope, etc. The duration of the measurement interval Δt is longer than the duration which the light emitted by the scanning device 14 requires to arrive back at the scanning device 14 again after reflection on the object 12. In the case of a periodic triangular function, the frequency v is a linear function of the time t, wherein the sign of the slope changes between successive measurement intervals Δt.

The light source 16 can contain, for example, a DFB laser, which emits light at a wavelength of 1550 nm and has a bandwidth between approximately 200 nm and 300 nm. The frequency modulation (chirp) is applied to the signal by an optical phased-locked loop OPPL. The VCO block of the phased-locked loop can have, for example, a tunable laser, which is injected into a Mach-Zehnder interferometer (MZI), followed by a photodiode PD. The measurement intervals Δt have a duration which is preferably between 10 μs and 100 μs.

A part of the optical output signals generated by the light source 16 is supplied via a splitter 17 to an amplifier 18, amplified there, and then allocated uniformly via three further splitters 19 onto four processing units PU1 to PU4, which are each framed by dashed lines in FIG. 3. The processing units PU1 to PU4 are thus arranged optically in parallel to one another. The splitters 19, which are arranged between the amplifier 18 and the processing units PU1 to PU4, are preferably designed such that the same optical output signal having equal intensity is applied at the inputs of the processing units PU1 to PU4 at a given point in time. In principle, however, it is also possible to allocate the optical intensity of the output signal unevenly, if the light emitted by the scanning device 14 should have a higher intensity in certain directions.

The structure of all four processing units PU1 to PU4 is identical and is explained in greater detail hereinafter on the basis of the example of the processing unit PU1.

The processing unit PU1 contains a distribution matrix M1, which has the structure of a tree having multiple levels and distributes the optical output signals generated by the light source 16 onto multiple optical waveguides W11 to W14. In the illustrated embodiment, the tree has only two levels for the sake of simplicity. One optical switch S11 is arranged on the first level and two optical switches S21, S22 are arranged on the second level. Each switch S11, S21, S22 is designed as a 1×2 switch and can contain, for example, a thermo-optical Mach-Zehnder interferometer. Due to the tree structure, the distribution matrix M1 can selectively distribute an output signal applied at the input onto each of the four optical waveguides W11 to W14.

Each of the four waveguides W11 to W14 is connected to a free space coupler FSC11 to FSC14. The free space couplers FSC11 to FSC14 can be designed, for example, as grating couplers or as edge couplers, as is known per se in the prior art. The free space couplers FSC11 to FSC14 are used to outcouple the optical output signals guided in the optical waveguides W11 to W14 into the adjoining free space and to couple optical output signals which were reflected on the object 12 as optical measurement signals back into the waveguides W11 to W14.

The processing unit PU1 additionally comprises a detector D1, which detects a superposition of the optical measurement signal reflected from the object 12 with a reference signal, which consists of a branched-off part of the optical output signal generated by the light source 16. The detector D1 is designed for this purpose as a symmetrical photodetector and is connected via splitters 21 and 17 to the light source 16.

The processing unit PU1 additionally contains an optical circulator C1, which is connected to the light source 16, the distribution matrix M1, and the detector D1 so that optical output signals supplied from the light source 16 are conducted to the distribution matrix M1 and optical measurement signals coming from the distribution matrix M1 are conducted to the detector D1. An optical circulator generally has three terminals (ports), wherein light which is incident at one terminal is relayed by the circulator to the respective next terminal (i.e., 1→2, 2→3 and 3→1). Photonic integrable optical circulators are known in the prior art, because of which their structure will not be described in greater detail at this point.

As already explained above, the other three processing units PU2 to PU4 are constructed in the same way. The free space couplers FSC of the four processing units PU1 to PU4 are arrayed in the illustrated embodiment along a line adjacent to one another, specifically with a pitch p, the value of which is between 25 μm and 400 μm. The free space couplers FSC are located here in the front focal plane of a deflection optical unit 20, which deflects the output signals outcoupled from the free space couplers FSC such that they are emitted in different directions. As a result of this arrangement in the front focal plane, there is an unambiguous association between each free space coupler FSC and an emission direction.

Figure 4:
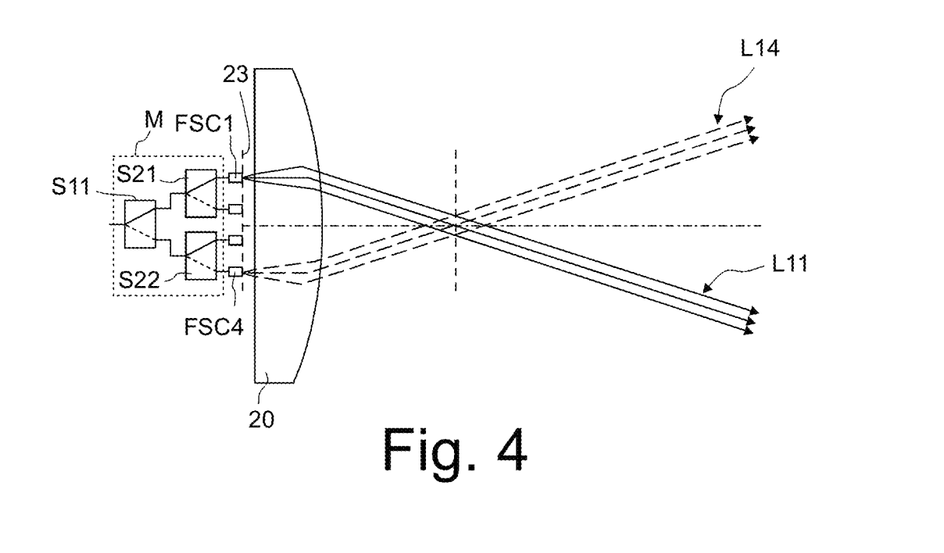
FIG. 4 shows a single distribution matrix and the deflection optical unit of the scanning device shown in FIG. 3.

FIG. 4 illustrates this relationship in a simplified illustration. Only one single distribution matrix M is shown, which distributes optical output signals onto four free space couplers FSC1 to FSC4. The output signals exiting divergently in the front focal plane 23 from the free space couplers FSC1 to FSC4 are collimated by deflection optical unit 20 and deflected in different directions, as illustrated in FIG. 4. If the optical signals are switched in series onto the free space couplers FSC1 to FSC4, the light beams originating from the scanning device 14 travel from the direction indicated by solid lines (light beam L11) step-by-step to the direction indicated by dashed lines (light beam L14).

Reference is again made to FIG. 3 hereinafter. The structure indicated on the right adjacent to the deflection optical unit 20 is a dispersive optical element 22, the significance of which is explained in greater detail below.

The optical switches S11, S21, S22 of the distribution matrices M1 to M4 and the light source 16 are controlled by a control and evaluation unit 24, which is indicated in FIG. 3 as a microprocessor μP. The control and evaluation unit 24 is additionally connected to the electrical outputs of the detectors D1 to D4.

3. Function

It is presumed hereinafter that the light source 16 generates an optical output signal, the frequency of which generates a periodic triangular signal, as already explained above.

The optical output signal is distributed after the amplification by the amplifier 18 onto the processing units PU1 to PU4 and transferred there by the circulators C1 to C4 to the distribution matrices M1 to M4 which selectively supply it to one of the free space couplers FSC. As a result of the parallel arrangement of the processing units PU1 to PU4, therefore precisely one optical output signal exits during each measurement interval Δt from each processing unit PU1 to PU4 and is directed by the deflection optical unit 20 in a direction which is determined by the location of the relevant free space coupler FSC in the focal plane of the deflection optical unit 20.

It is assumed hereinafter that these light beams are the light beams L11 to L14, which are shown in FIG. 2. If these light beams L11 to L14 emitted in a horizontal plane are incident on the object 12, they are diffusely reflected on its surface and thus radiated back over a larger solid angle range. A small part of the light incident on the object 12 is retroreflected, i.e., radiated back in the same direction along which the light has propagated on the path to the object 12. The light paths of the optical output signals and the measurement signals reflected on the object 12 for the free space coupler FSC11 are indicated by arrows for the light beam L11 in FIG. 3.

The measurement signals are coupled into the free space couplers FSC and reach the circulator C1 to C4 of the respective processing unit PU1 to PU4, which supplies them to the corresponding detector D1 to D4, via the distribution matrices M1 to M4. The measurement signals are superimposed there with the optical output signals generated by the light source 16.

During the period which the light requires for the path to the object 12 and back, the frequency of the optical output signals generated by the light source 16 has changed. Since the optical output signals and the measurement signals have similar frequencies, the superposition results in a beat, the frequency of which can be ascertained by calculating the FFT (Fast Fourier Transform). The beat frequency can be converted directly into a distance value. In addition, the relative velocity between the vehicle 10 and the object 12 can be inferred from the Doppler shift. Interference signals from the ambient light or from scanning devices of other vehicles 10 cannot impair the measurement due to a lack of coherence with the output signals generated by the light source 16.

These calculations are carried out by the control and evaluation unit 24. It associates the calculated distances and relative velocities with the directions in which the optical output signals were emitted by the deflection optical unit 20. A three-dimensional image of the environment is thus obtained.

The significance of the optional dispersive optical element 22, which can be designed, for example, as an optical grating, is explained hereinafter. The dispersive optical element 22 splits the optical signals depending on the wavelength in a plane, which is arranged at least essentially perpendicular to the plane within which the optical output signals exiting from the free space couplers FSC propagate. This wavelength-dependent splitting perpendicular to the plane of the paper is indicated in FIG. 3 by a beam bundle 26. Within a horizontal scanning plane, as shown in FIG. 2, the light beams L11 to L14 have, for example, frequencies within a first frequency band, the light beams L21 to L24 of the next scanning plane inclined thereto have frequencies in a second frequency band different therefrom, etc.

To be able to generate multiple optical output signals in different frequency bands simultaneously, the light source 16 contains multiple individual sources (not shown), the output signals of which are in different frequency bands and which are superimposed, so that all processing units PU1 to PU4 receive optical output signals in multiple frequency bands simultaneously.

Scanning perpendicular to the plane of the paper can alternatively also be effectuated in a conventional manner with the aid of a rotating mirror. Since such a mirror only has to rotate around one axis, it can be constructed to be mechanically robust. However, it is preferable for this scanning direction to dispense with the use of movable components.

Due to the parallel arrangement of the processing units PU1 to PU4 each having a relatively small number of optical switches S11, S21, S22, the measurement light reflected from the object 12 only has to pass through few optical switches and only one of the circulators C1 to C4 on its path to one of the detectors D1 to D4. In a distribution matrix M having 8 outputs, the insertion loss of the entire distribution matrix is, for example, 3 dB, which corresponds to a loss of approximately 50%. The reflected measurement signal is thus only attenuated relatively little on its path to the respective detector D and can be detected with sufficiently high signal-to-noise ratio. A high pixel rate is nonetheless achieved, since multiple (here: four) light beams can be generated simultaneously.

Furthermore, the fact that due to the allocation of the optical output signals onto multiple processing units PU1 to PU4, a very high optical intensity is not applied at the input of each distribution matrix M1 to M4, is advantageous in the parallel structure, as has to be the case in distance scanners having a single large distribution matrix due to the then greater overall insertion loss. This is because it has been shown that above all the optical switches subjected to the highest intensities on the lowest level of the distribution matrices—i.e., the switches S11 here—cannot permanently withstand very high intensities.

4. Structure and Function of the Optical Distribution Matrices

FIGS. 5a to 5d show two adjacent distribution matrices M1, M2 in different switch positions for an embodiment, in which each distribution matrix M1, M2 can selectively distribute incoming optical output signals onto one of in each case eight optical waveguides, which are connected to free space couplers FSC. For the sake of simplicity, the free space couplers FSC shown on the right are only numbered by Arabic numerals, specifically in the sequence in which they emit optical output signals. The free space couplers FSC which are connected in the given switch position of the optical switches to the input of the respective distribution matrix M1, M2 are highlighted in FIGS. 5a to 5d by a dark background and an arrow arranged adjacent. Therefore, optical output signals can exit from the free space coupler FSC thus highlighted and enter again as measurement signals after reflection at the object 12.

In contrast to the embodiment shown in FIG. 3, the distribution matrices M1, M2 each have three levels N1, N2, N3, wherein the number of the optical 1×2 switches doubles in each case upon the transition to the next higher level. If 1×3 switches are used as optical switches, the number of the optical switches correspondingly triples between successive levels. Instead of the 1×n switches, of course, n×n switches can also be used, in each of which one input remains unoccupied.

In the switch matrices M1, M2, two different types of optical switches are used, which are referred to in short hereinafter as fast optical switches and as slow optical switches. The fast optical switches have a grey background in FIGS. 5a to 5d and are highlighted by rounded corners. The fast optical switches have the property that they have a short switching time, i.e., they can change their switching state in a very short time. However, this is accompanied by a comparatively high insertion loss.

In the slow switches, in contrast, the switching time is longer, so that they cannot change their switching state as fast as the fast switches. In return, the slow switches have a lower insertion loss than the fast switches, so that optical signals are attenuated less upon the passage through the slow switches than upon the passage through a fast switch.

In the illustrated embodiment, the fast switches are exclusively at the lowest level N1 and thus at the input of the distribution matrices M1, M2. Exclusively slow optical switches are used for the higher levels N2 and N3. By way of suitable activation of the distribution matrices M1, M2, the distribution matrices M1, M2 can have a very low insertion loss overall, but nonetheless can be operated using the short switching times of the fast switches. Such an activation is explained in greater detail hereinafter.

Figure 5A:
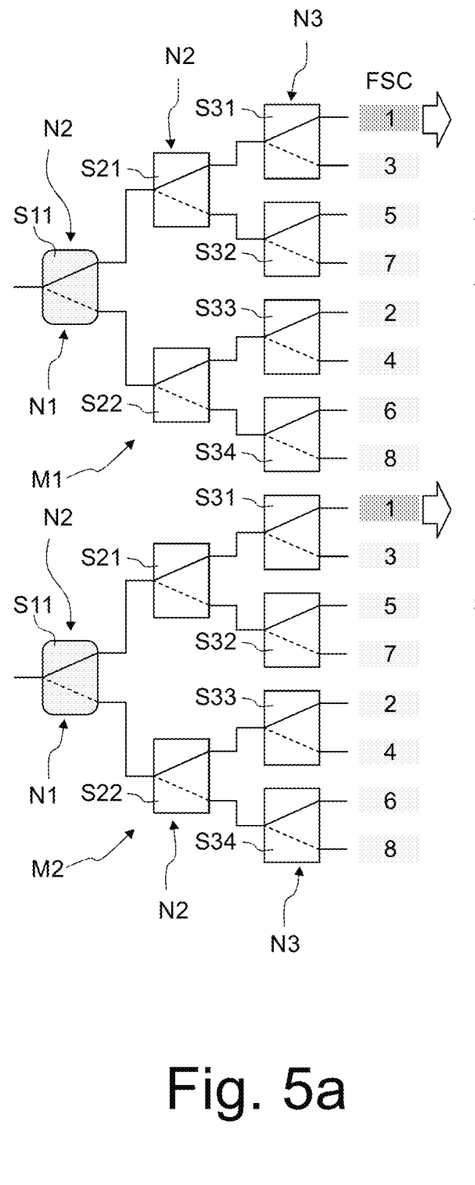
FIGS. 5a to 5d show the distribution matrices of two adjacent processing units in different switching states.

FIG. 5a shows the two distribution matrices M1, M2 during a first measurement interval Δt1. The fast optical switch S11 in each distribution matrix M1 conducts the optical output signals to the slow switch S21 and these to the slow switch S31, so that the optical output signals exit from the free space coupler FSC1. Therefore, only the switches S11, S21, and S31 are active in this switch position; no optical output signals exit through the remaining optical switches during the first measurement interval Δt1.

After ending of the measurement interval Δt1, the fast optical switch S11 of the distribution matrices M1, M2 is switched. This switching takes place very fast, since the fast optical switch S11 has a short switching time. Therefore, only little time is lost for switching the distribution matrices M1, M2 between two successive measurement intervals.

Figure 5B:
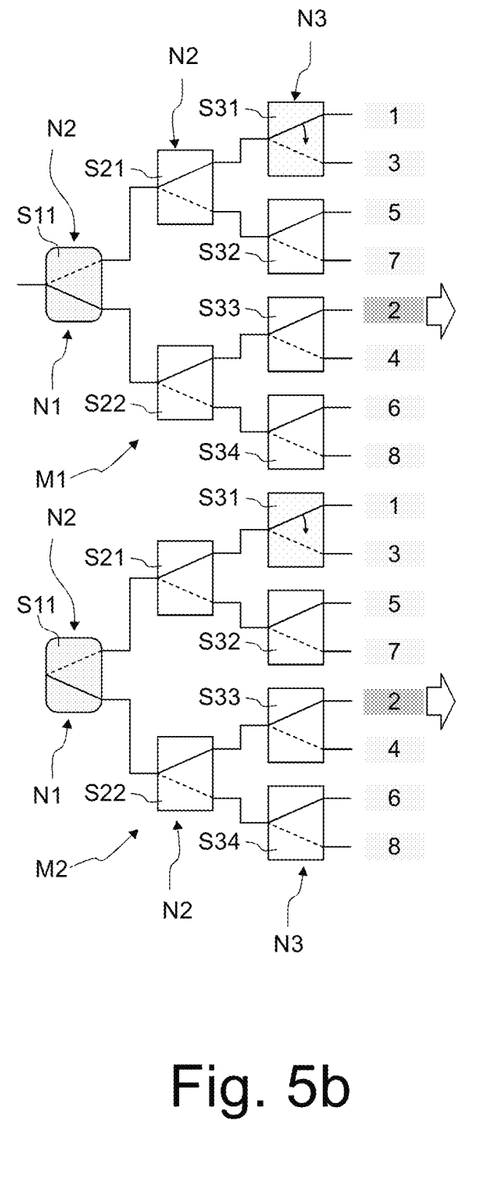

As a result of the switching of the switch S11, the optical output signals are now supplied via the slow switches S22 and S33 to the free space couplers FSC2, which are not arranged adjacent to the free space couplers FSC1, however, as is apparent in FIG. 5b.

Figure 5C:
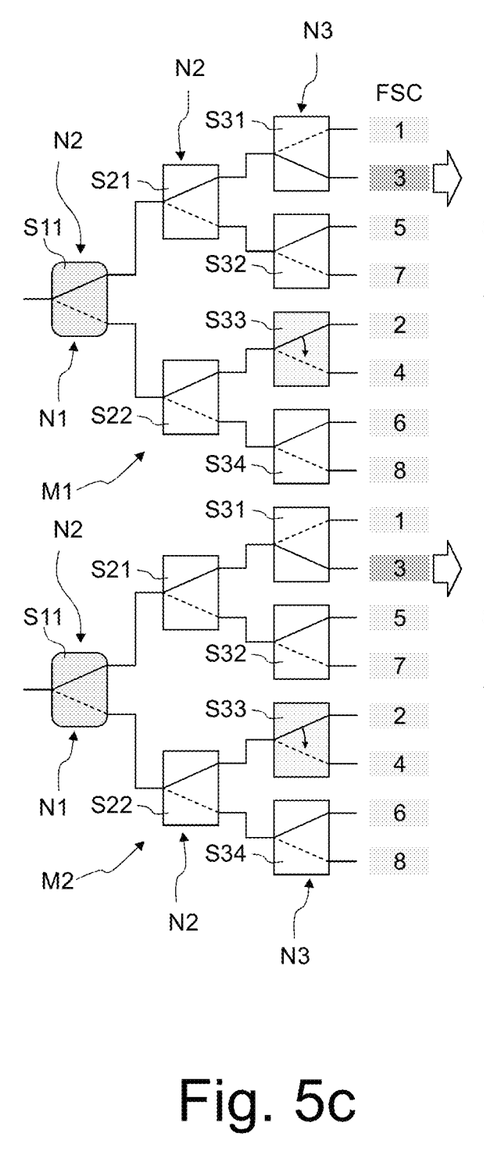
Figure 5D:
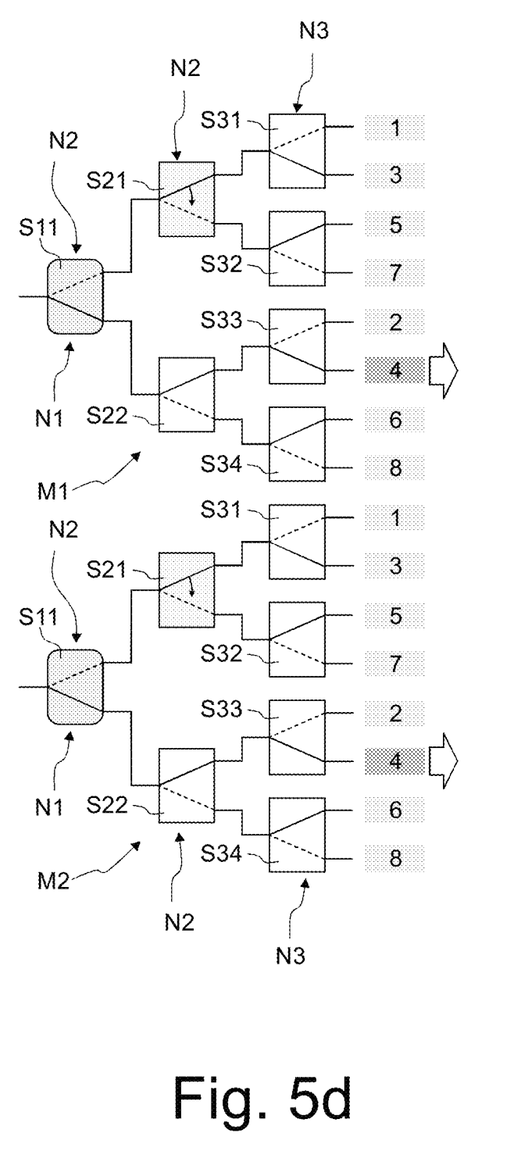

During the second measurement interval Δt2, the slow optical switch S31 is switched to the level N3 in each distribution matrix M1, M2. In FIGS. 5b to 5d, the slow optical switches which are adjusted during a measurement interval are highlighted by a grey background and an arrow. The entire measurement interval Δt2 is available for this switching, so that the maximum switching speed of the slow switches only has to be shorter than the length of the measurement intervals.

After completion of the second measurement interval Δt2, in each of the distribution matrices M1, M2, the fast switch S11 on the level N1 is returned back into its original switch position. As a result of this switching and the previously occurring switching of the slow switch S31, the optical output signals are now each conducted to the free space coupler FSC3, as illustrated in FIG. 5c. The free space coupler FSC3 is also not arranged adjacent to the previously active free space coupler FSC2. During the third measurement interval Δt3 an inactive slow optical switch, the switch S33 here, is again switched.

If the fast optical switch S11 changes its position again after completion of the third measurement interval Δt3, the optical signals are immediately supplied to the free space coupler FSC4, as shown in FIG. 5d. During the fourth measurement interval Δt4, the slow switch S21 is switched from the second level N2, to be able to connect the input of the distribution matrices M1, M2 to the free space coupler FSC5 in the following fifth measurement interval, etc.

Since the free space couplers FSC arranged along a line adjacent to one another are not switched through in succession, but rather the fast optical switch S11 always switches back-and-forth between two groups of four free space couplers each, the maximum switching speed of the distribution matrices M1, M2 is only limited by the short switching times of the fast switches S11. Nonetheless, the insertion loss of the two distribution matrices M1, M2 is low, since the optical output signals (and in the reverse direction the measurement signals reflected from the object 12) predominantly pass through optical switches having a particularly low insertion loss on the levels N2 and N3.

The greater the number of the levels, the less the higher insertion loss of the fast switches S11 is significant. On the other hand, the number of the levels should also not be excessively large, since the slow switches at the higher levels also noticeably attenuate the optical signals. Three or four levels and thus a distribution onto eight or sixteen optical waveguides, respectively, have proven to be ideal.

5. Further Embodiments

Figure 6A:
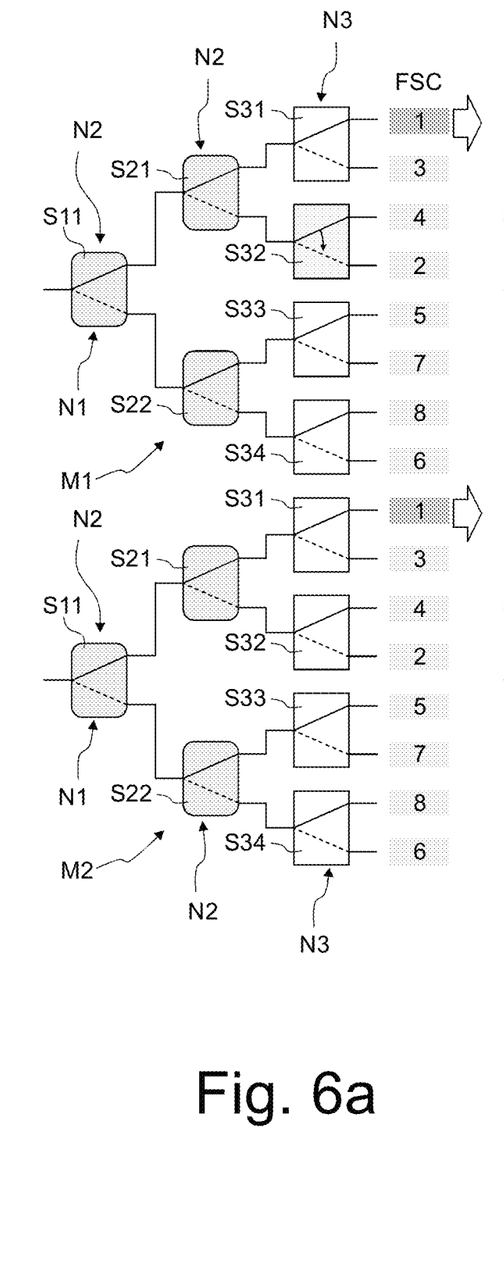
FIGS. 6a and 6b show a variant for distribution matrices in which fast switches are arranged in two different levels of the distribution matrices to be able to activate the free space couplers more flexibly.
Figure 6B:
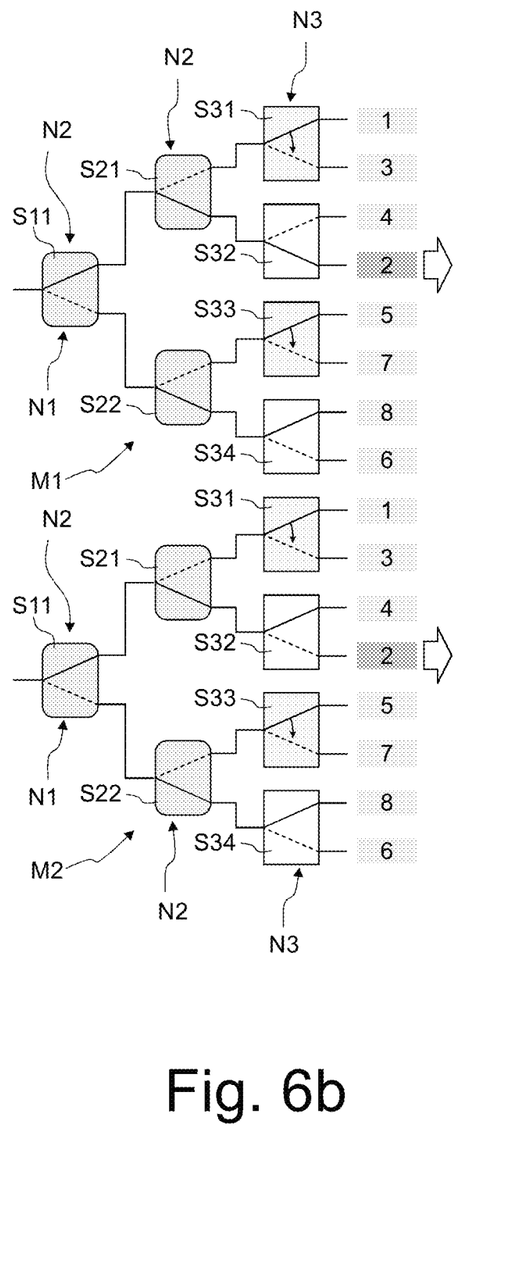

FIGS. 6a and 6b show an embodiment in which fast optical switches are arranged not only in the lowest level N1, but rather also in the next higher level N2. As a comparison of FIGS. 6a and 6b shows, the free space couplers FSC, in which optical output signals exit in successive measurement intervals Δt, are thus closer to one another than in the embodiment shown in FIGS. 5a to 5d. This can be advantageous for certain applications.

However, for most applications—among them also distance scanners for vehicles—the sequence in which the free space couplers FSC emit optical output signals does not play a role. Since a higher insertion loss results due to the additional fast optical switches on the level N2, the arrangement shown in FIGS. 5a to 5d is generally preferable.

Figure 7:
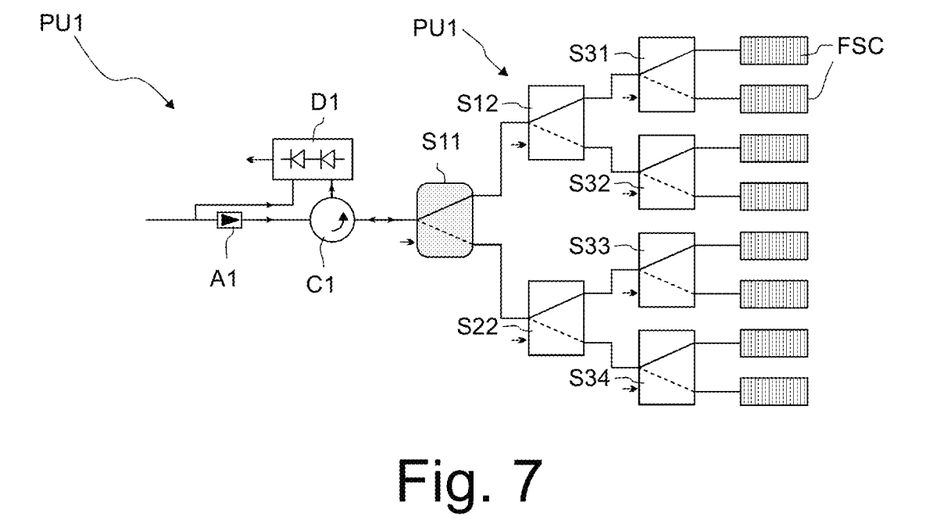
FIG. 7 shows a processing unit of the scanning device which additionally contains an amplifier.

FIG. 7 shows, in a schematic illustration based on FIG. 3, a processing unit PU1 according to one embodiment, in which the optical output signals generated by the light source 16 are not already amplified with the aid of the amplifier 18 before the distribution onto the processing units PU1 to PU4, but rather only within the individual processing units. For this purpose, each of the processing units contains a separate amplifier, which is identified by A1 for the processing unit PU1 in FIG. 7. In addition, the distribution matrix M1 of the processing unit PU1 contains not two, but rather three levels, so that eight free space couplers FSC can be activated.

Figure 8:
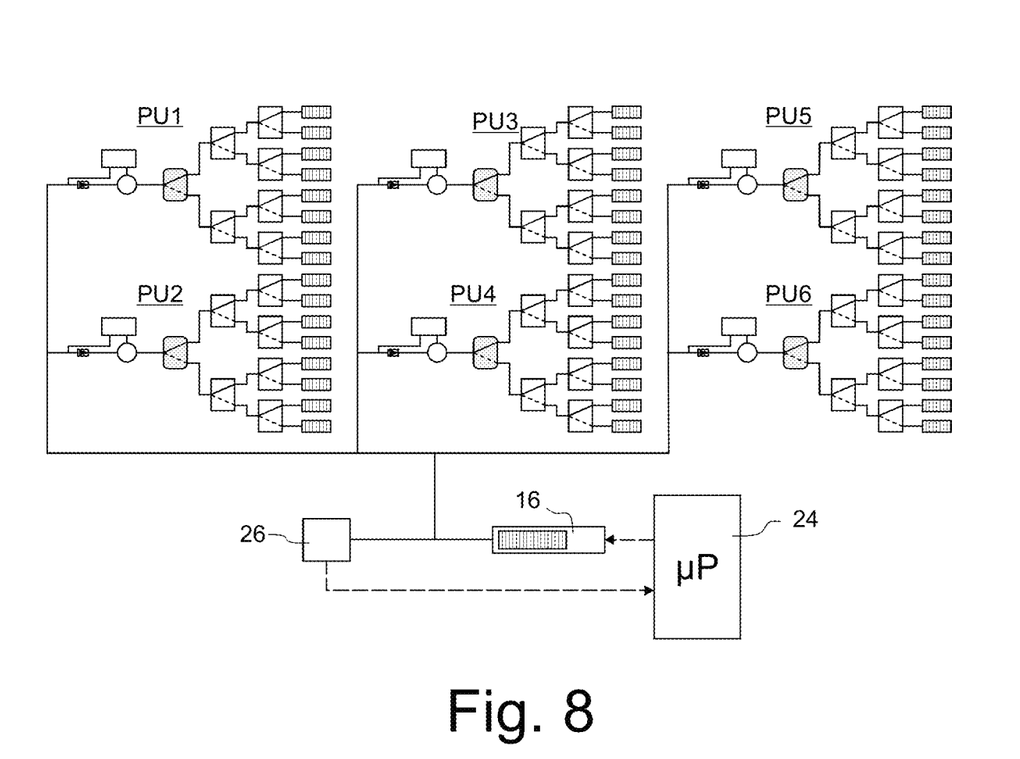
FIG. 8 shows an arrangement of multiple processing units according to FIG. 7, which results in a regular arrangement of the free space couplers in a two-dimensional array.

FIG. 8 shows an arrangement of six processing units PU1 to PU6, which each have the structure shown in FIG. 7. As a result of this arrangement, the free space couplers FSC1 as a whole are not arranged along a line, but rather adjacent and one above another in a regular two-dimensional array. If such an arrangement is arranged in the focal plane of the deflection optical unit 20, the environment may be scanned in the horizontal and vertical directions even without using the dispersive optical element 22 and a more complex light source 16. The respective processing units PU1 and PU2, PU3 and PU4, and PU5 and PU6 arranged directly adjacent can each, for example, effectuate the scanning in horizontal planes, which are arranged inclined in relation to one another in the vertical direction, as illustrated in FIGS. 1 and 2.

The invention claimed is:

1. A device for scanning measurement of a distance to an object, comprising:
    a light source configured to generate an optical output signal having a time-varying frequency,
    a plurality of optical processing units that are connected optically in parallel to the light source, wherein each processing unit comprises:
        an optical distribution matrix that has a plurality of optical switches and is configured to distribute an optical output signal, which is supplied to the respective processing unit, selectively to different optical waveguides,
        a plurality of free space couplers, wherein there is a one-to-one correspondence between the optical waveguides and the free space couplers such that each free space coupler is connected to an associated optical waveguide, and wherein each free space coupler is configured
            to outcouple an optical output signal, which is guided in the associated optical waveguide, into the free space, and
            to couple an optical output signal, which was reflected on the object, into the associated optical waveguide as an optical measurement signal,
        at least one detector configured to detect a superposition of the optical measurement signal and the optical output signal generated by the light source, and
        an input port which is connected to the at least one detector and to the plurality of free space couplers so that optical output signals supplied from the light source are directed to the distribution matrix, and optical measurement signals coming from the free space couplers are directed to the detector,
    a deflection optical unit configured to deflect the optical output signals outcoupled from the free space couplers so that they are emitted in different directions, and
    an evaluation unit configured to determine a distance to the object from the superposition detected by the detectors.

2. The device of claim 1, wherein the deflection optical unit has a front focal plane in which the free space couplers or images of the free space couplers are arranged.

3. The device of claim 1, wherein the detectors are symmetrical photodetectors and are connected to the light source.

4. The device of claim 1, comprising an optical amplifier that is arranged in a light path between the light source and the processing units.

5. The device of claim 1, wherein the light source is configured to generate simultaneously multiple optical output signals having a time-varying frequency in different frequency bands.

6. The device of claim 5, wherein the deflection optical unit comprises a dispersive optical element that splits the optical output signals depending on a wavelength in a first plane, which is arranged at least essentially perpendicular to a second plane, within which the optical output signals exiting from the free space couplers propagate.

7. The device of claim 1, wherein the light source is configured to generate an optical output signal having a frequency that linearly rises and linearly falls alternately over time.

8. The device of claim 1, wherein the free space couplers are arranged adjacent to one another in a two-dimensional array.

9. The device of claim 1, in which the optical distribution matrix has a structure of a tree having multiple levels and comprises:
   at least one first optical switch, which has a first switching time and a first insertion loss, and
   a plurality of second optical switches each having a second switching time, which is longer than the first switching time, and a second insertion loss, which is less than the first insertion loss,
wherein the first optical switch is arranged on a first level of the tree that is lower than a second level of the tree on which the second optical switches are arranged.

10. The device of claim 9, wherein the first level is a lowest level of the tree, and wherein exclusively second optical switches are arranged on all other levels of the tree.

11. A device for scanning measurement of a distance to an object, comprising:
   a light source configured to generate an optical output signal having a time-varying frequency,
   a plurality of optical waveguides,
   an optical distribution matrix that has a structure of a tree having multiple levels and is configured to distribute an optical output signal generated by the light source successively to the plurality of optical waveguides, wherein the optical distribution matrix comprises:
      at least one first optical switch, which has a first switching time and a first insertion loss, and
      a plurality of second optical switches each having a second switching time, which is longer than the first switching time, and a second insertion loss, which is less than the first insertion loss,
   wherein the first optical switch is arranged on a first level of the tree that is lower than a second level of the tree on which the second optical switches are arranged,
   a detector configured to detect a superposition of an optical measurement signal, which was reflected at the object, with the optical output signal generated by the light source, and
   an evaluation unit that is configured to determine a distance to the object from the superposition detected by the detector.

12. The device of claim 11, comprising a plurality of free space couplers, wherein there is a one-to-one correspondence between the optical waveguides and the free space couplers such that each free space coupler is connected to an associated optical waveguide, and wherein each free space coupler is configured to outcouple an optical output signal, which is guided in the associated optical waveguide, into the free space.

13. The device of claim 12, wherein each free space coupler is configured to couple an optical output signal, which was reflected on the object, into the associated optical waveguide as the optical measurement signal.

14. The device of claim 12, comprising a deflection optical unit configured to deflect the optical output signals outcoupled from the free space couplers.

15. The device of claim 14, wherein the deflection optical unit has a front focal plane in which the free space couplers or images of the free space couplers are arranged.

16. The device of claim 14, wherein the light source is configured to generate simultaneously multiple optical output signals having a time-varying frequency in different frequency bands.

17. The device of claim 16, wherein the deflection optical unit comprises a dispersive optical element that splits the optical output signals depending on a wavelength in a first plane, which is arranged at least essentially perpendicular to a second plane, within which the optical output signals exiting from the free space couplers propagate.

18. The device of claim 12, wherein the free space couplers are arranged adjacent to one another in a two-dimensional array.

19. The device of claim 11, wherein the detector includes a symmetrical photodetector and is connected to the light source.

20. The device of claim 11, wherein the light source is configured to generate an optical output signal having a frequency that linearly rises and linearly falls alternately over time.

21. A method for scanning measurement of a distance to an object, said method comprising the following steps:
   a) generating, with a light source, optical output signals having a time-varying frequency;
   b) distributing, with each of a plurality of optical processing units arranged optically in parallel, via an optical distribution matrix, which comprises a plurality of optical switches, the optical output signals supplied to the processing units onto different optical waveguides, wherein at a given point in time, exactly one optical output signal is outcoupled into the free space from each processing unit;
   c) outcoupling the optical output signals guided in the optical waveguides into a free space and emitting the optical output signals in different directions;
   d) coupling the optical output signals reflected on the object as optical measurement signals into the optical waveguides;
   e) directing the optical measurement signals to the detectors of the processing unit;
   f) detecting, with the detectors of the processing units, a superposition of the optical measurement signals and the optical output signals generated by the light source; and
   g) determining a distance to the object from each superposition detected by the detectors.

22. The method of claim 21, wherein the optical distribution matrix has a structure of a tree having multiple levels and comprises:
   at least one first optical switch, which has a first switching time and a first insertion loss, and
   a plurality of second optical switches each having a second switching time, which is longer than the first switching time, and a second insertion loss, which is less than the first insertion loss, wherein the first optical switch is arranged on a first level of the tree that is lower than a second level of the tree on which the second optical switches are arranged.

23. The method of claim 22, wherein the first optical switch is only actuated in times between two successive measurement intervals, and wherein the second optical switches are also actuated at least during the measurement intervals.

* * * * *